United States Patent [19]

Hartness

[11] Patent Number: 4,616,745

[45] Date of Patent: Oct. 14, 1986

[54] APPARATUS FOR ALIGNING AND FEEDING ARTICLES UPRIGHT ON AN ARTICLE LOADING MACHINE

[76] Inventor: Robert G. Hartness, 1720 Hudson, Greer, S.C. 29651

[21] Appl. No.: 593,574

[22] Filed: Mar. 26, 1984

[51] Int. Cl.$^4$ ............................................. B65G 47/26
[52] U.S. Cl. ................................. 198/442; 198/463.4
[58] Field of Search ............... 198/358, 367, 437, 442, 198/836, 491, 345, 425

[56] References Cited

U.S. PATENT DOCUMENTS

| | | | |
|---|---|---|---|
| 3,012,650 | 12/1961 | Carter | 198/836 |
| 3,193,078 | 7/1965 | Amenta et al. | 198/442 |
| 3,462,823 | 8/1969 | Heisler | 198/491 |
| 4,014,428 | 3/1977 | Ossbahr | 198/345 |
| 4,066,163 | 1/1978 | Rowekamp | 198/442 |
| 4,147,248 | 4/1979 | Kurczak et al. | 198/442 |
| 4,158,624 | 6/1979 | Ford et al. | 198/442 |

Primary Examiner—Joseph E. Valenza
Assistant Examiner—D. Glenn Dayoan
Attorney, Agent, or Firm—Dority & Manning

[57] ABSTRACT

Apparatus for automatically aligning and feeding articles upright on an article loading machine between spacer rails to form lanes of articles such as bottles aligned in a row is disclosed. The apparatus includes a pivoting chute (A) which pivots to and fro across a conveyor (32) to feed articles (34) intermittently into the parallel lanes (24, 26, 28, 30) defined by spacer rails (14, 16, 18, 20, 22) over the conveyor. The pivoting guide chute includes an inlet (38) which receives bottles already conveyed in a single row. The guide chute includes an outlet (39) where a releasable feed mechanism (C) holds the bottle as the chute mechanism swings from one lane to the next and then releases a predetermined number of bottles at the entrance end (24a, 26a, 28a, 30a) of each lane. Serially connected air cylinders (120, 122, 124) provide a stepwise indexing of the chute means fron one lane to the next for dispensing of the bottles. The opening and closing of the feed mechanism is controlled by air cylinders (100, 102, 106).

14 Claims, 7 Drawing Figures

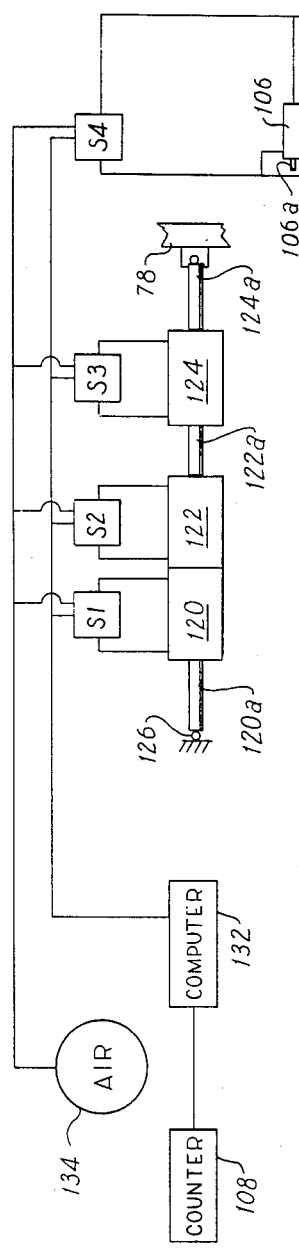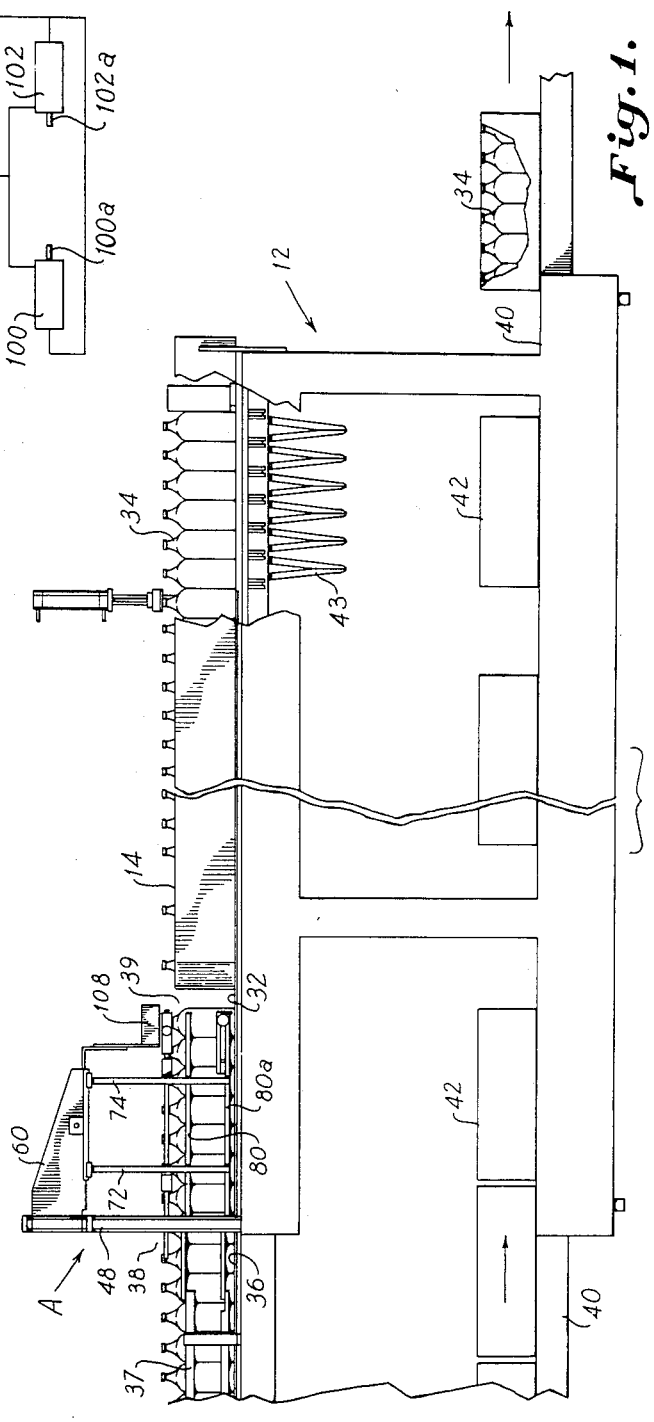

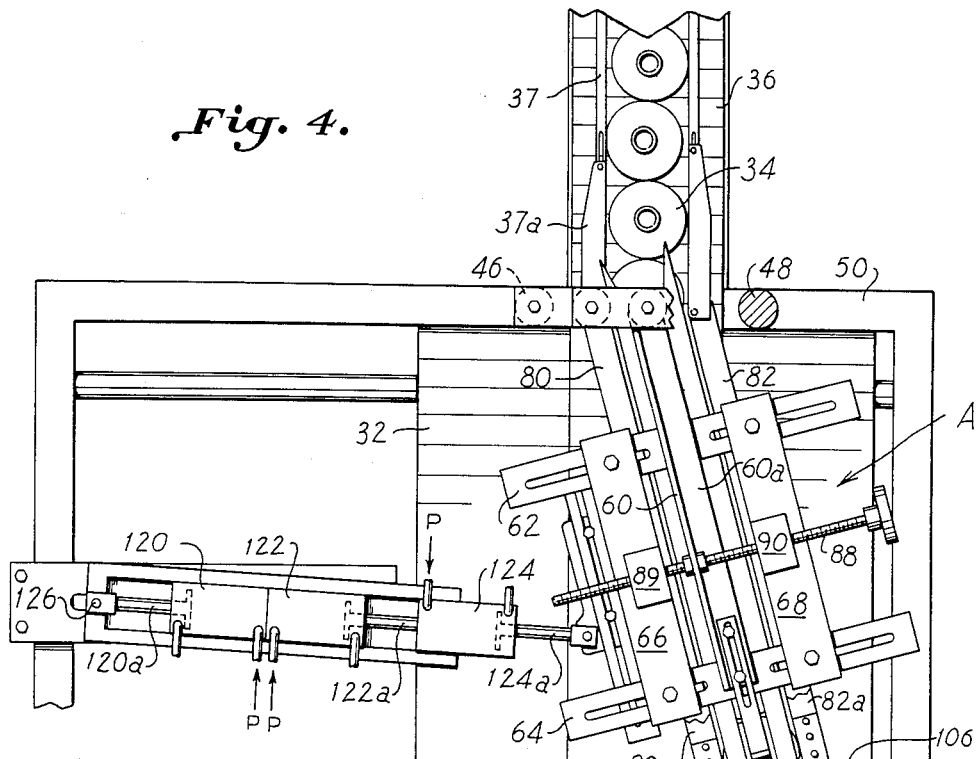
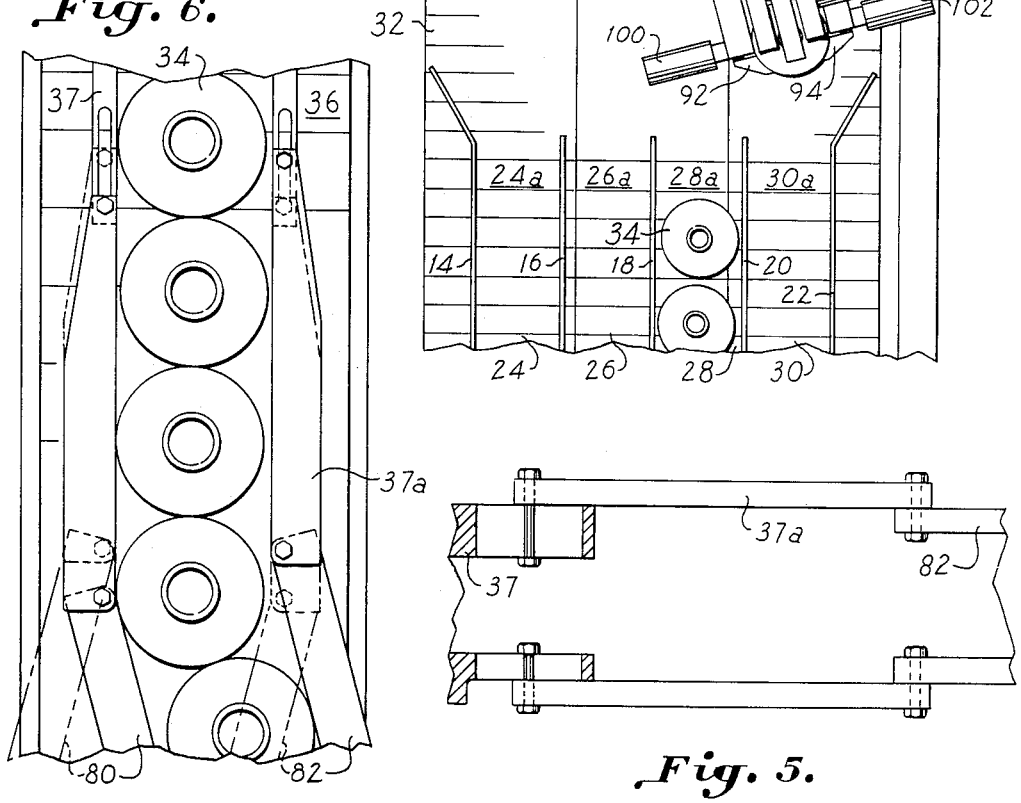

4,616,745

APPARATUS FOR ALIGNING AND FEEDING ARTICLES UPRIGHT ON AN ARTICLE LOADING MACHINE

BACKGROUND OF THE INVENTION

The invention relates to apparatus for automatically dividing articles conveyed on the article packing machine into parallel lanes. In bottle handling machines, bottles are typically conveyed on a conveyor in a co-mingled manner. It is often necessary to separate the articles into aligned parallel rows for further conveyance of the articles to a packing station. At the packing station the bottles are often packed into containers with partitioned sockets. The spacing of the bottles in the parallel rows by means of distinct lanes facilitates the packing of the bottles in the containers. Aligning of the co-mingled bottles into parallel rows is a problem to which considerable attention need be given.

Prior bottle handling machines such as the case packing machine shown in U.S. Pat. Nos. 3,481,108 and 3,555,770 have utilized a plurality of parallel spaced guide rails for separating the co-mingled mass of bottles into aligned parallel rows. Quite often, however, the bottles become tilted on the conveyor and fall over in front of the guide rails causing the bottles to jam up in front of the guide rails requiring the stopping of the conveyor and repositioning of the bottles in an upright position by a machine attendant. U.S. Pat. No. 4,029,195 proposes cone-shaped guide members which wedge the tilted bottles into an upright position so that they may be guided individually into the parallel rows between the spaced rails.

Swing-arm article guiding chutes have been proposed for use on bottle loading packing machines to feed the bottles into lanes. One proposed swing-arm device was manufactured by the Vicker's Miller/Hydro Mfgr. Co. of Bainbridge, Ga. To swing the chute, optical sensors were proposed to find the lanes which controlled electrical solenoid switches which, in turn, controlled an electric motor to swing the chute across the conveyor. An air cylinder piston rod provides a gate to hold the leading bottle in the chute until a lane is reached. The optical/solenoid control swing-arm device is complicated and expensive owing to the electrical wiring and other electrical elements required. The environment in which the swing-arm chute operates is not entirely suitable for optical sensor operation. The gate of the chute does not afford effective control of bottles tilting at the gate.

Accordingly, an important object of the present invention is to provide apparatus for automatically guiding articles conveyed on an article loading machine into spaced parallel rows.

Still another important object of the present invention is to provide apparatus for handling bottles in a co-mingled mass and automatically guiding and feeding any number of bottles into spaced parallel rows between spacer rails on an article loading machine.

Still another important object of the present invention is to provide apparatus for automatically releasing bottles individually into lanes defined by spaced guide rails on a bottle loading machine.

Yet another important object of the present invention is to provide apparatus for holding individual articles upright on an article loading machine and releasing the individual article at a desired position so that the article is automatically conveyed upright into a desired lane between two spacer rails.

Still another important object of the present invention is to provide apparatus which automatically releases bottles into lanes defined between spacer rails on an article loading machine and indexes the releasing of the articles at an entrance end of a desired lane across the width of the conveyor.

SUMMARY OF THE INVENTION

The above objectives are accomplished according to the present invention by providing a pivoting chute on an article conveyor into which individual bottles are fed in a row. The pivotal chute includes a releasable feed mechanism which holds an individual bottle upright at an outlet of the chute and releases it at the correct moment and position into a lane defined by spacer plates. An indexing drive mechanism indexes the pivotal chute across the width of the conveyor to release bottles into successive lanes across the width of the conveyor. An actuation means opens the feed mechanism to feed any number of bottles at each lane.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a side elevation illustrating an article packing machine with an apparatus for automatically aligning and feeding the articles into spaced parallel rows between guide rails on a conveyor, FIG. 4 is a top plan view of the apparatus of FIG. 2, FIG. 5 is a side elevation of a linkage for pivotally supporting the apparatus of FIG. 4, FIG. 6 is a top plan view of the linkage assemblies for pivotally supporting the apparatus of FIG. 4, FIG. 7 is a schematic diagram illustrating a pneumatic circuit for indexing the pivotable guide chute to discharge positions across the conveyor according to the invention and feeding a number of bottles at each discharge position.

DESCRIPTION OF A PREFERRED EMBODIMENT

Figure 2:
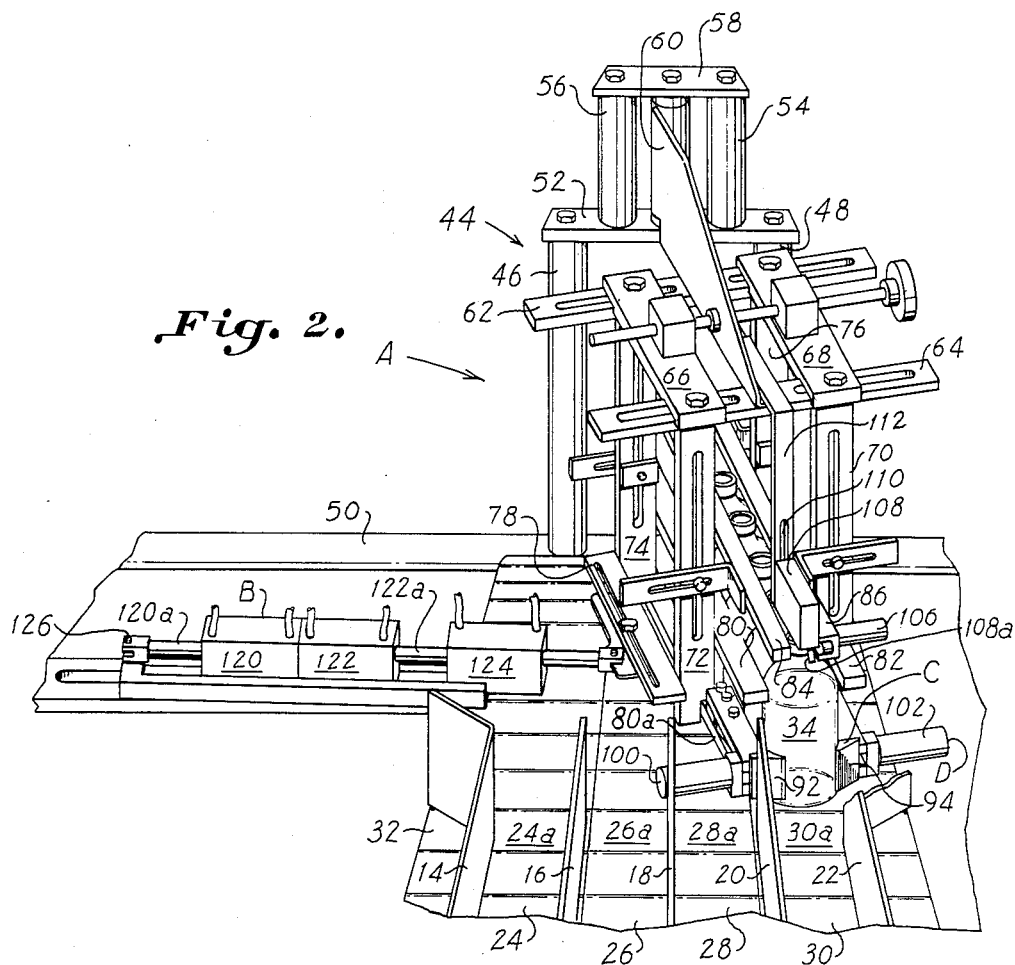
FIG. 2 is a perspective view of the apparatus for automatically aligning and feeding bottles in spaced parallel rows between guide rails according to the present invention.
Figure 3:
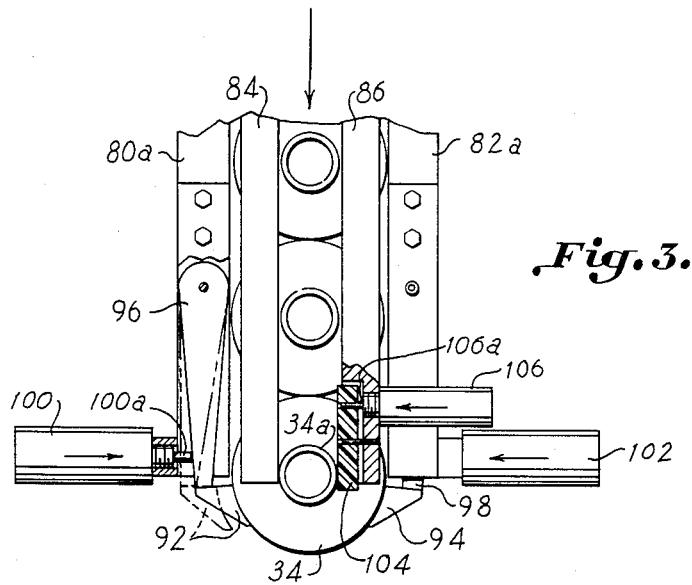
FIG. 3 is a top plan view of an outlet of a guide chute for automatically feeding and aligning upright bottles into guide rail lanes according to the invention.

Referring now in more detail to the drawings, there is illustrated an article loading machine, designated generally as 12, which includes the apparatus according to the present invention for aligning articles in parallel lanes on the packing machine for subsequent packing into a container. The article loading machine 12 is of the type having a plurality of spaced rails 14, 16, 18, 20 and 22 for separating the articles. Lanes 24, 26, 28, and 30 are defined between the respective rails. The lanes are parallel and spaced across the width of the conveyor and each lane includes an entrance end 24a, 26a, 28a, and 30a.

The apparatus according to the present invention includes a pivoting guide chute means, designated generally as A, which is carried by the article loading machine adjacent a conveyor 32. The pivoting guide chute receives the articles 34 after they have been arranged in a single file on a single conveyor 36 upstream of the pivoting chute means A. Inlet side frame means 37 channels the articles upstream and conveys them in a row to the inlet of the chute A. Frame means 37a pivotably connects frame 37 to the chute A. The pivoting guide chute means includes inlet 38 in which the articles 34 are fed and an outlet 39 which dispenses the articles at the entrance end of the respective lanes across the width of the conveyor.

Indexing drive means B moves the pivoting guide chute means in a reciprocating motion back and forth across the conveyor 32 to position and dispense the articles at a respective entrance end of the lanes in succession and sequence across the width of the conveyor. A releasable feed means C is carried adjacent the outlet of the guide chute means having a closed position in which the articles are held upright until it is the proper time for the article to be dispensed at which time the feed means opens. Actuation means D is carried by the guide chute which releases the feed means C and allows an article to be released and dispensed in a discharge position at the entrance end of a lane.

As can best be seen in FIG. 1, the article loading machine includes the frame 12 which supports a lower container conveyor 40 and the upper article conveyors 36 and 32. The lower conveyor 40 conveys boxes 42 in which the articles 34 are packed. The articles are loaded through a conventional grid set 43 into the containers 42 either by means of the grid set being lowered or the containers being raised in a conventional manner.

There is a support frame, designated generally as 44, for pivotably supporting the guide chute A which includes a pair of spaced standards 46 and 48 carried on cross-bar 50. Across the top of the standards is a bridge plate 52 which supports a second pair of standards 54 and 56. A second bridge plate 58 interconnects the two standards and a plate 60 is pivotally connected to a pivot extended between the plates 52 and 58 about which the plate 60 pivots. Attached to the plate 60 is a bottom flange 60a. To the flange plate 60a are attached a pair of cross members 62 and 64 (FIG. 4). Attached to plates 62 and 64 is a pair of transverse plates 66 and 68 (FIG. 2). Four vertical legs 70, 72, 74, and 76 depend downwardly from the plates 66 and 68. An interconnecting plate 78 connects the legs 74 and 72.

Chute means A includes adjustable side frame means for holding and containing articles 34 in the chute upright. The side frame means includes lower horizontal rail members 80, 80a and 82, 82a which guide the lower body portion of the article and upper horizontal rails 84 and 86 which guide the upper portion of the article through the chute which is the neck where the article is a bottle. The sides of the frame adjust by means of a screw bolt 88 threaded into blocks 89 and 90 fixed to plates 66 and 68. As bolt 88 is turned, the side frames described above may be moved inwards or outwards since the side frames are attached by means of adjusting slots in the supporting structure.

Releasable feed means C includes a first engagement means which comprises a pivotable jaw 92 pivotably attached to bottom rail 80a (FIG. 1). The engagement means further includes a pivotal jaw 94 carried on the opposing side of the chute outlet and pivotally attached to an opposing bottom rail (not shown). Arms 96, 98 pivotably connect the jaws 92, 94 to their respective bottom rail chute structure. Each engagement means gripper jaw 92, 94 may be formed from plastic or any other suitable material for gripping and holding the articles 34 upright against the inflow of articles at the inlet of the chute. For this purpose, the jaws are contoured to conform to the cylindrical shape of the bottle in the application illustrated. Actuation means for opening and closing the jaws includes a pair of air cylinders 100 and 102. The jaws 92 and 94 are connected to the respective pistons of the air cylinders 100 and 102. When air is admitted to the cylinders, the jaws are closed against the article. When the air is vented from the cylinders, the jaws open and release the article and allow it to be dispensed into the entrance end of a lane.

Releasable feed means C includes a second engagement means 104 for engaging an upper portion of the article such as the neck of the bottle so that the bottles are held upright when the lower body portion of the bottles is engaged by the contoured jaws 92 and 94 and pressure from the rearward inflow of bottles is encountered. The secondary engagement means includes a movable presser foot plate 104 which is connected at one end to a piston 106a of an air cylinder 106. As air is admitted to the cylinder 106 foot plate 104 moves outward to engage a neck 34a of the article 38. This prevents the bottle from falling over when gripped at the bottom and under the inflow force of articles. An electro/mechanical counter 108 is provided for counting the articles 34 and is adjustably mounted so that the articles hit a counting trigger 108a. For this purpose, the counter 108 is vertically adjustable by means of a slot mount which includes a vertical slot 110 formed in a depending arm 112 affixed to cross arm 64. The counter 108 may be affixed at a desired vertical position in slot 110 by any suitable means such as a nut and bolt (not shown), so that trigger 108a is properly positioned. A suitable counter is manufactured by Honeywell Microswitch, of Freeport, Ill., Model No. V3L-111-D8. The counter output is fed to a conventional computer which controls the number of bottles fed into a lane.

Indexing drive means B includes a series of air cylinders 120, 122, and 124 which are double-acting air cylinders. Air cylinders 120 and 122 are joined back-to-back while air cylinder 124 is joined front-to-back with air cylinder 122. The piston rod 124a of air cylinder 124 is connected to the plate 78 affixed to the pivoting guide chute A. Air cylinder 120 is pivotally attached at 126 to the machine frame. All three cylinders 120 through 124 are carried in a slide block 128 in which they slide.

The air cylinders 120 through 124 act in sequence to index the movement of the chute to and fro across the width of the conveyor 32. As can best be seen in FIGS. 2 and 4, the guide chute is positioned at the extreme right side of the conveyor at the entrance end 30a of lane 30. The piston rods of the three air cylinders are fully extended. As the piston rod 124a retracts the chute indexes to the entrance end 28a of lane 28. As piston rod 122a is retracted due to venting of air, the chute is positioned at entrance end 26a of lane 26. Finally, as piston 120a is retracted, the chute is positioned at entrance end 24a of lane 24. The remaining air cylinders 122 and 124 travel with the movement of air cylinders 120. In the reverse operation, the piston rods are extended by the admission of air in the reverse order to index the chute back across the conveyor.

At each entrance end, the release means D actuated by air cylinders 100 and 102 will release an article at the entrance end of the desired lane across the conveyor.

While any suitable control of the various actuating air cylinders may be had, having been taught the essence of the invention, FIG. 7 illustrates one suitable circuit diagram for the control which includes a conventional counter device 108, referred to above, and a conventional computer or microprocessor 132 into which the count signals are fed. Three-way electrical solenoid switches S1, S2, and S3 are provided for controlling the admission of air to the air cylinders 120 through 124. The computer controls the switches in a conventional manner to either admit or vent air from the respective air cylinders as required for indexing of the chute. A fourth electrical solenoid switch S4 supplies air to the release actuator mechanisms 100, 102 and 106 in a conventional manner to release the jaws 96 and 98 and presser foot 104 to release and feed a predetermined number of articles. The counter can be set to release one or a multiple number of articles at the entrance end of each lane as desired.

In operation, when the counter is set to one, a single article will be released at the entrance end of each lane as the chute is indexed successively back and forth across the conveyor, stopping at each lane in order. At the onset, with all of the air cylinders being vented, the chute is at the entrance end 24a of lane 24. Actuation of the releasable feed means 100, 102, and 106 will dispense an article into lane 24. Next, air will be admitted to cylinder 120 and the chute will be indexed to the entrance end 26a of lane 26. Next, air will be admitted to air cylinder 122 and the chute will be indexed to entrance end 28a of lane 28. Finally, air will be admitted to cylinder 124 and the chute will be indexed to the entrance end 30a of lane 30. At each of the respective entrance ends, the switch S4 will vent air from the air cylinders 100, 102 and 106 which will move these article engagement means to an open position to release an article. Computer 132 may be set to hold the engagement means open and release any number of bottles at each lane. Counter 108 counts the bottles and delivers the count to computer 132 which admits air via switch 54 to close the engagement jaws when reaching the number set in computer 132.

It will be understood, of course, that while the form of the invention herein shown and described constitutes a preferred embodiment of the invention, it is not intended to illustrate all possible form of the invention. It will also be understood that the words used are words of description rather than of limitation and that various changes may be made without departing from the spirit and scope of the invention herein disclosed.

What is claimed is:

1. For use in an article loading machine of the type having a conveyor on which articles are conveyed, a plurality of parallel plates spaced across a width of the conveyor defining parallel lanes therebetween through which the articles are conveyed in separated parallel rows, apparatus for automatically feeding the articles into parallel lanes comprising:

pivoting guide chute means carried by said article loading machine adjacent said conveyor for receiving the articles conveyed on the conveyor and holding the articles in a single file row;

said pivoting guide chute means having an inlet end through which said articles are received and an outlet end from which said articles are fed into said lanes;

indexing drive means for sequentially moving said pivoting guide chute means in a lateral motion across the width of the conveyor to successively position said outlet end of said pivoting guide chute means adjacent an entrance end of each said lane;

releasable feed means means carried adjacent said outlet end of said guide chute means for engaging and retaining an article in a feed position in said chute until said chute reaches a discharge feed position adjacent said entrance of each said lane, said releasable feed means including:

(i) upper fixed rail means for contacting an upper portion of said article;

(ii) upper stop means for positioning said upper portion of said article adjacent said upper fixed rail means; and (iii) lower oppositely moving stop means for contacting a lower portion of said article on opposite sides thereof for a non-tilting arresting of said article therebetween;

actuation means included for opening said releasable feed means and feeding an article into said lane upon said pivoting guide chute means reaching one of said discharge feed positions;

said actuation means closing said releasable feed means to positively hold a next remaining article in said guide chute means in said discharge feed position while said pivoting guide chute means is moved to a next adjacent discharge feed position at an entrance end of the next adjacent lane; and said indexing drive means including a plurality of air cylinders being connected serially together to advance said pivoting guide chute means across said conveyor.

2. The apparatus of claim 1 wherein said lower oppositely moving stop means includes a pair of pivotable gripper jaws which open to release and close to engage said articles.

3. The apparatus of claim 1 wherein said actuation means for opening and closing said releasable feed means includes air cylinders having piston rods, and said lower oppositely moving stop means are carried on the ends of the piston rods for gripping and engaging said articles to hold them positively in said feed position.

4. The apparatus of claim 1 wherein said pivoting guide chute means includes a body side frame means for engaging a main body portion of an article beingheld in said chute.

5. The apparatus of claim 1 or 2 wherein said upper stop means includes a neck engaging foot means for positively engaging the neck portion of said articles and holding them upright in said pivoting guide chute means.

6. Apparatus for automatically guiding and feeding articles conveyed on an article packing machine into parallel aligned lanes defined by spaced parallel plates carried by said machine, each said lane having an entrance end in which said articles enter into said lane, said apparatus comprising:

pivoting guide means carried by said article packing machine over the conveyor on which said articles are conveyed;

said pivoting guide chute having an inlet for receiving said articles and an outlet from which said articles are fed into said lanes;

said pivoting article guide chute means including article aligning side walls which contain and align said articles generally in a row in the direction of conveyance on said machine;

step indexing means moving said pivoting guide chute means in pivotable increments to the entrance ends of adjacent lanes successively across the width of said conveyor;

releasable article feed means carried by said pivoting guide chute means adjacent said outlet having an open positions for releasing an article from said outlet when said pivoting guide chute means is pivoted to an entrance end of one of said lanes, said releasable article feed means having a closed position for retaining said articles in said pivoting guide chute means during movement between said lanes:

actuation means for moving said releasable feed means between said open and closed positions; and said releasable article feed means including lower oppositely moving stop means for arrestingly engaging a lower side portion of said article therebetween, upper fixed rail means for engaging an upper side portion of said article, and upper stop means for positioning said upper side portion of said article adjacent said upper fixed rail means to maintain said article in an upright feed position in the outlet of said pivoting guide chute means.

7. The apparatus of claim 6 wherein said pivoting guide chute means includes adjustable side frame means for engaging sides of said articles to contain them in a single file row in said chute means.

8. The apparatus of claim 6 wherein said lower oppositely moving stop means of said releasable article feed means includes a pair of opposed contoured gripper jaws pivotably carried adjacent said outlet of said pivoting guide chute means and actuation means connected to said opposed contoured gripper jaws for opening and closing said opposed contoured gripper jaws about said articles.

9. The apparatus of claim 6 wherein said upper stop means includes a presser foot carried by said pivoting guide chute means which moves towards said upper fixed rail from said open to said closed position to engagingly arrest said article therebetween.

10. Apparatus for feeding articles into parallel lanes on an article packing machine of the type which includes a conveyor on which the articles are conveyed, a plurality of parallel spaced plates carried across the width of the conveyor defining parallel lanes into which the articles are conveyed for separation into parallel rows, and means for lowering and packing the articles arranged in the rows into individual containers, said apparatus comprising:

chute means carried by the article packing machine adjacent said conveyor on an infeed side of the said parallel lanes;

said chute means having an inlet for receiving said articles conveyed on said conveyor and an outlet from which said articles are fed individually into selected ones of said lanes;

indexing drive means for moving said chute means across said conveyor to an entrance end of said lanes for feeding a predetermined number of said articles into said lanes;

feed means for grippingly holding an article against tilting movement in an upright feed position at said outlet of said chute means while said chute means is being moved from one lane to a next lane against the infeed of articles at the inlet of and of said chute means, said feed means including:
 (i) upper fixed rail means for contacting an upper portion of said articles;
 (ii) upper stop means for positioning said upper portion of said article adjacent said upper fixed rail means; and
 (iii) lower stop means conforming to the profile of a lower portion of said article for arrestingly engaging said lower portion of said articles;

actuation means for releasing said articles from said feed means in said upright position so that said articles are conveyed from said chute means directly into an entrance end of said desired lane;

said indexing drive means including a plurality of air cylinders operatively connected to one another in series, said chute means being connected to said air cylinders for movement thereby; and the stroke of each one of said air cylinders corresponding to the distance required for moving said chute means from the entrance end of one lane to the entrance end of a next adjacent lane.

11. The apparatus of claim 10 including adjustable side frame means included in said chute means for engaging the sides of said articles and containing said articles in an upright position.

12. The apparatus of claim 10 including inlet frame means for guiding articles conveyed on said conveyor into said inlet of said chute means in a row.

13. The apparatus of claim 10 wherein said lower stop means includes an open position in which said articles is released and fed into said lane and a closed position in which said article is held for movement between said lanes.

14. The apparatus of claim 1 or 10 wherein two of said air cylinders are mounted back-to-back with said piston rods operating in opposing directions.

* * * * *